Sept. 13, 1955 A. A. HEMPHILL ET AL 2,718,003

QUADRANTAL ERROR CORRECTING MEANS FOR MAGNETIC ANTENNAS

Filed Feb. 5, 1954 5 Sheets-Sheet 1

ALFRED A. HEMPHILL
JOHN M. TEWKSBURY
*INVENTORS*

*BY*

Killman and Kerst
ATTORNEYS

QUADRANTAL ERROR CORRECTING MEANS FOR MAGNETIC ANTENNAS

Filed Feb. 5, 1954 5 Sheets-Sheet 2

ALFRED A. HEMPHILL
JOHN M. TEWKSBURY
*INVENTORS*

*BY*

Killman and Kerst
ATTORNEYS

ALFRED A. HEMPHILL
JOHN M. TEWKSBURY
*INVENTORS*

*BY*

Killman and Kerst
*ATTORNEYS*

ALFRED A. HEMPHILL
JOHN M. TEWKSBURY
*INVENTORS*

*BY*

Killman and Kerst
ATTORNEYS

ALFRED A. HEMPHILL
JOHN M. TEWKSBURY
*INVENTORS*

*BY*

*Lillman and Kerst*
ATTORNEYS

United States Patent Office 2,718,003
Patented Sept. 13, 1955

2,718,003

QUADRANTAL ERROR CORRECTING MEANS FOR MAGNETIC ANTENNAS

Alfred Amos Hemphill, Baltimore, and John Merle Tewksbury, Lutherville, Md., assignors to Bendix Aviation Corporation, Towson, Md., a corporation of Delaware

Application February 5, 1954, Serial No. 408,432

8 Claims. (Cl. 343—114)

This invention relates to antennas of the magnetic type and more particularly to arrangements for compensating flush type magnetic antennas for quadrantal errors.

A magnetic antenna is depicted in Figs. 2, 3 and 4 of U. S. application Serial No. 264,717 for "Magnetic Antenna Systems," filed January 2, 1952, in the name of Alfred A. Hemphill.

A direction finder system incorporating a magnetic antenna, or any antenna system suitable for the purpose, will indicate the direction of arrival of radio waves at the antenna. This may not be the true direction to the transmitting station because the direction of travel of electromagnetic waves is affected by: (1) refraction, when travelling from one medium to another where the dielectric constants are different; (2) reflection, when encountering conductive material; and (3) an object in the field, where the object has an actual and/or effective permeability different than the medium in which it exists. In aircraft or surface craft installations, the greatest distortion is caused by the effect of the conducting surface of the craft. These errors are described in the book "Wireless Direction Finding" by Keen, published by Iliffe & Sons Ltd., London, England. Since the above mentioned errors change sign in each quadrant they are commonly called "quadrantal" errors.

Two usual provisions for correcting errors of the second type involve the use of fixed or adjustable cams and external correction loops. External correction loops require too much space to permit their use in flush type installations while cam correctors require additional space and power to drive them. Both provisions also substantially increase the cost of the direction finding antenna.

It is an object of this invention to provide a means for compensating for quadrantal errors in flush mounted magnetic antennas by the use of simple and inexpensive structures.

It is a further object to provide such a means which adds very little weight to the antenna installation and does not protrude from the flush mounting.

It is another object to provide such a means which does not require additional power to produce compensation.

These and other objects and advantages are realized by compensating arrangements which change the sensitivity of one or more of the collector bars.

Referring to the drawings:

Fig. 1 illustrates a plan view of a typical magnetic antenna;

Figs. 2*a* to 2*d* illustrate sensitivity and directivity patterns of the type of antenna depicted by Fig. 1;

Fig. 3 illustrates a plan view of the antenna of Fig. 1 wherein the pick-up has been rotated 45° counterclockwise;

Figs. 4*a* to 4*d* illustrate sensitivity and directivity patterns of the antenna depicted in Fig. 3;

Figure 9:
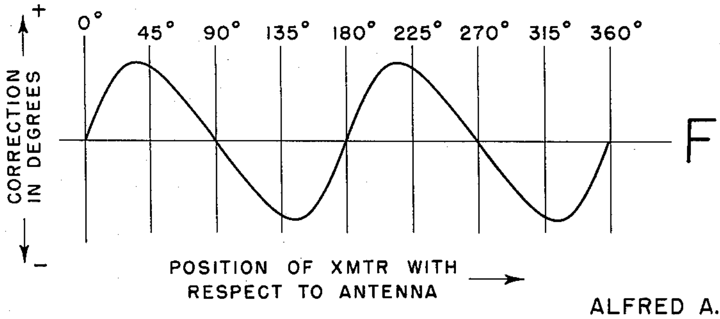

Figs. 8*a* to 8*d* illustrate sensitivity and directivity patterns of a magnetic antenna incorporating the invention; and Fig. 9 is a plot of the correcting action of an antenna incorporating the invention.

Figure 1:
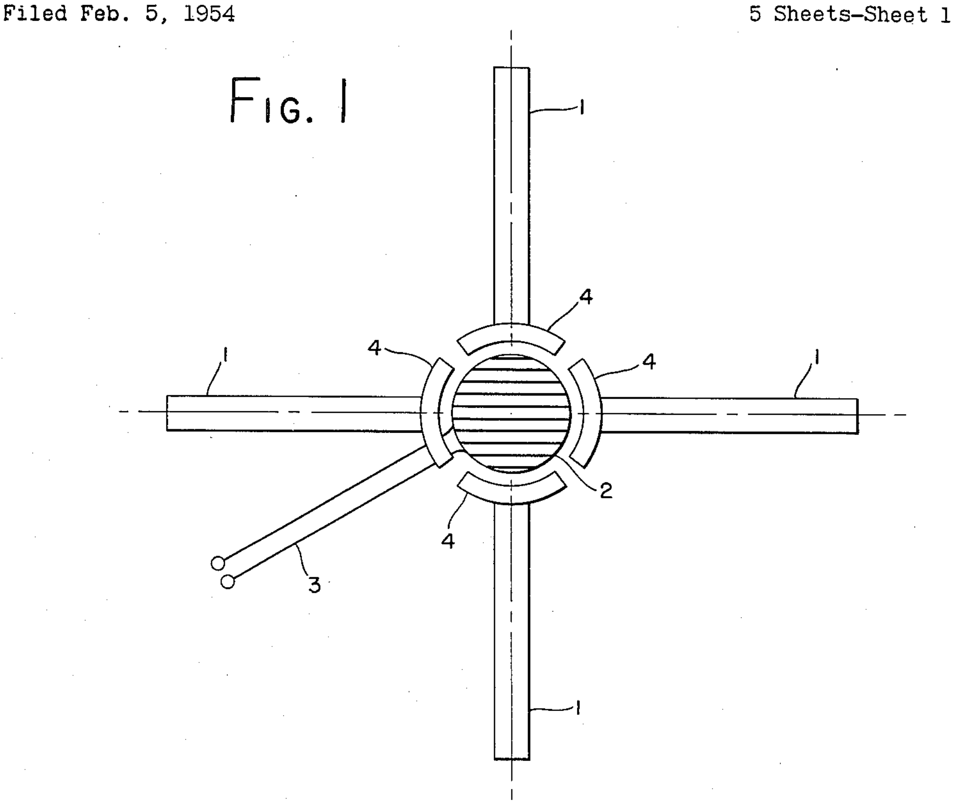

Referring to Fig. 1, a typical magnetic antenna is shown which consists of collector bars 1, pole pieces 4 and a center pick-up 2 comprising a coil of wire 3. It will be noticed that in the particular antenna illustrated, the center-lines of the collector bars 1, which are at right angles, are coincident with the center-lines of their respective pole pieces 4. This means that the angles at which the magnetic wave front is intercepted by the bars 1 will be the same angles at which the energy will be coupled into the pick-up 2 by the pole pieces 4. Therefore, the field existing in the pick-up 2 will have the same directional orientation as the field existing about the antenna. Because the pick-up 2 is fixed in a particular rotational position, the amount of voltage induced in the wires 3 will be functions of the field strength and of the angle of approach thereto of the magnetic wave.

Figures 2A, 2B, 2C, 2D, 4A, 4B, 4C, 4D:
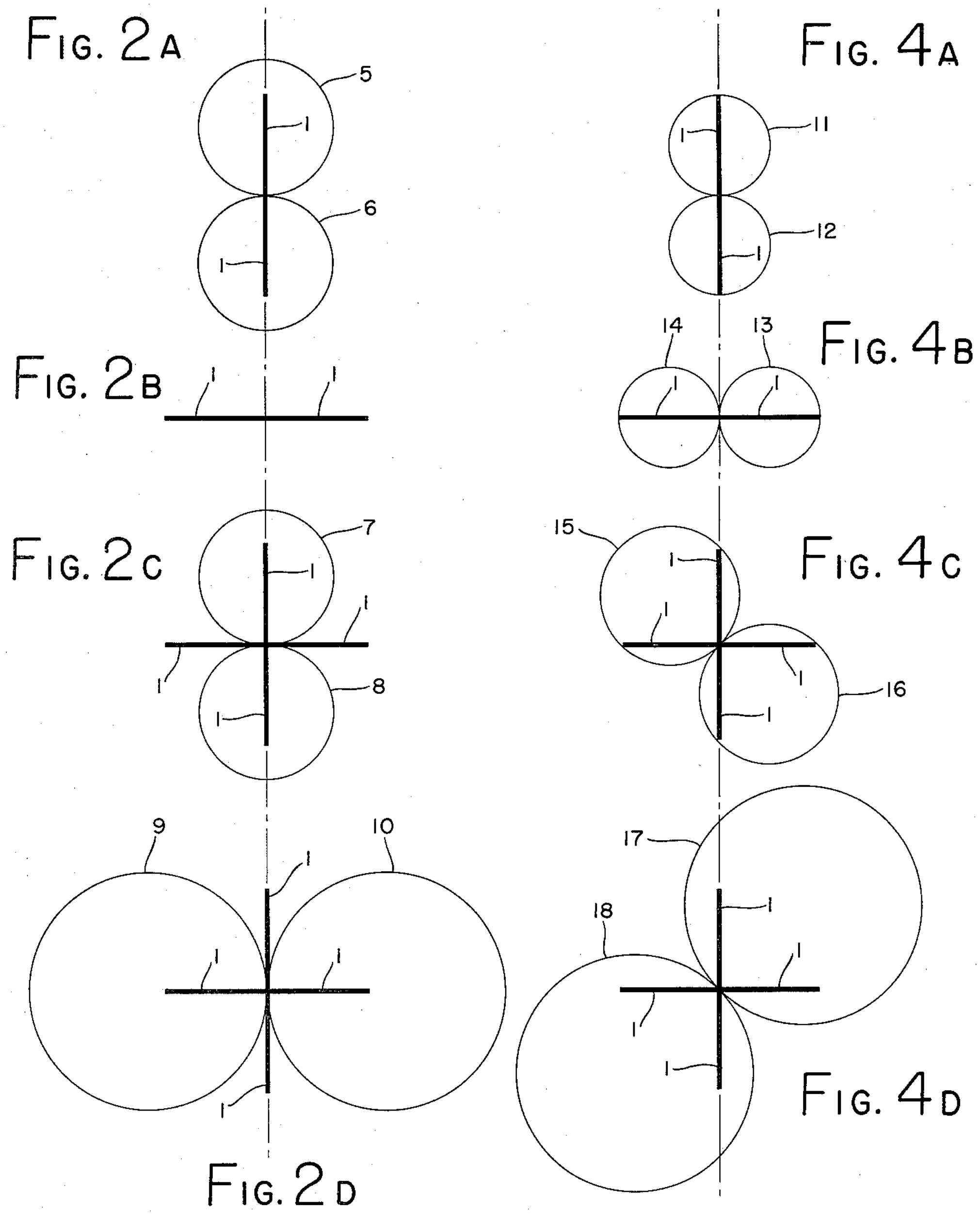

A pattern, consisting of circles 7 and 8, of the magnetic signal sensitivity of the antenna illustrated in Fig. 1 is shown in Fig. 2*c*. Although the pick-up 2 is not shown, it is located in the same position as in Fig. 1. Fig. 2*a* illustrates the pattern of the magnetic signal sensitivity of the pick-up 2 with the particular pair of the bars 1 shown in the pattern. Because of the position of the pick-up 2 with respect to these particular bars 1, a condition of maximum magnetic signal sensitivity exists when the magnetic field is parallel to these bars 1. Referring to Fig. 2*b*, the position of the pick-up 2 with respect to the particular pair of bars 1 illustrated in Fig. 2*b* is such that no signal is produced in the pick-up 2. Therefore, the magnetic signal sensitivity pattern of the composite antenna is that of Fig. 2*a*, which is shown, with both pairs of bars 1, in Fig. 2*c*. As the electric and magnetic fields are at right angles to the direction of propagation of the electromagnetic wave, a pattern of the directivity of the antenna will be at right angles to the pattern of the magnetic signal sensitivity thereof. This is illustrated in Fig. 2*d* by circles 9 and 10.

Figure 3:
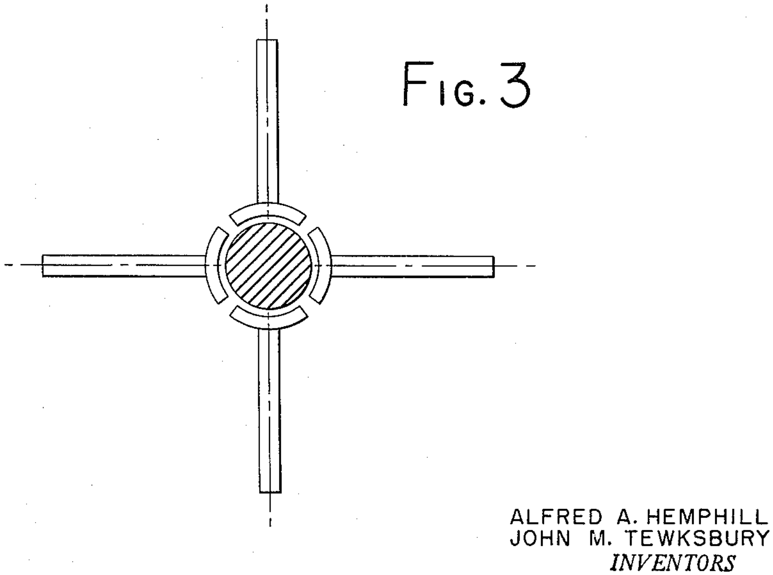

If the pick-up 3 is rotated, as in Fig. 3, the pattern of the directivity of the antenna will rotate therewith. This is illustrated in Figs. 4*a* to 4*d*. The circles 11 through 16 of Figs. 4*a*, 4*b* and 4*c* are plots of the magnetic signal sensitivity of the antenna and its component parts. The circles 17 and 18 of Fig 4*d* form a plot of the directivity of the antenna of Fig. 3. It will be noted that the patterns of the magnetic signal sensitivities as illustrated by Figs. 2*c* and 4*c* are equal in magnitude.

Figure 5:
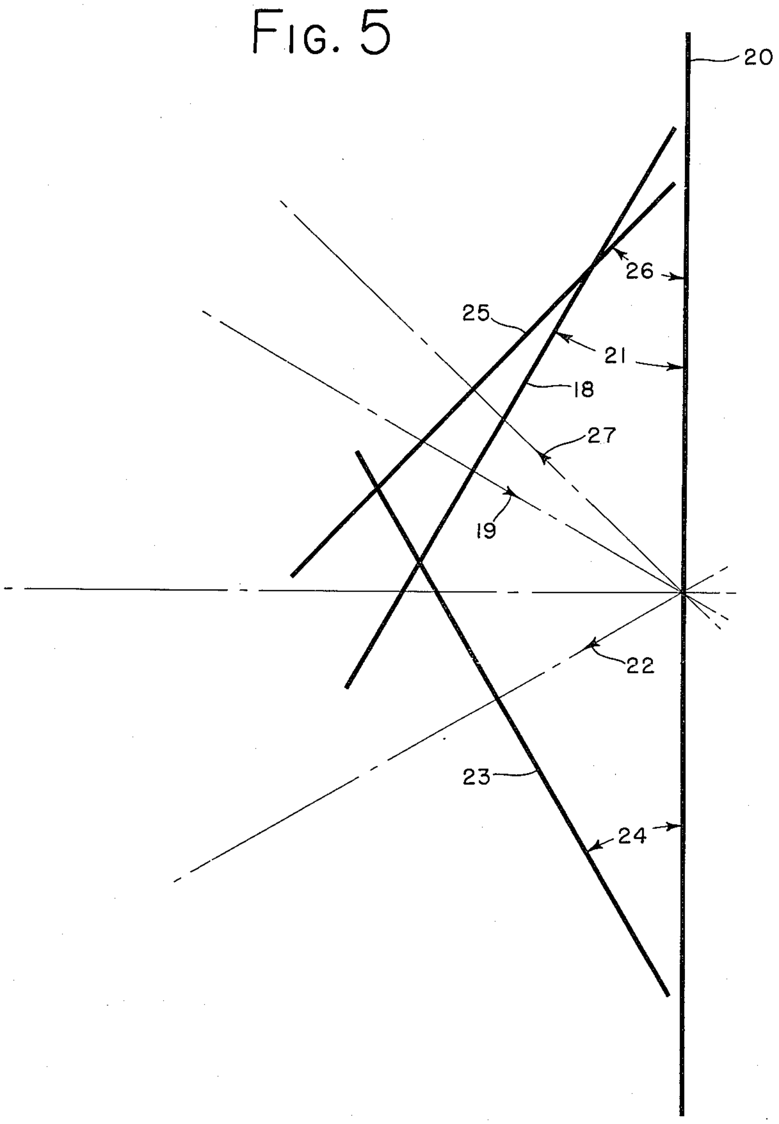
Fig. 5 illustrates wave fronts of electromagnetic waves that are in the vicinity of a conducting surface.

When an electromagnetic wave strikes an object containing a conducting surface, distortions take place within the portion of the electromagnetic field that is in relatively close proximity to the surface. This distortion is caused by a re-radiation of energy from the surface such that the re-radiated field combines with the initial field. Referring to Fig. 5, a line 18 is shown which is parallel to the wave front of an electromagnetic field advancing in a direction indicated by an arrow 19. The line 18 encounters a conducting surface 20 at an angle 21. The energy of this field is partially re-radiated by the conducting surface 20 in a direction indicated by an arrow 22 such that a line 23, which is parallel to the wave front of the re-radiated energy, subtends an angle 24 with the surface 20. The angle 24 is equal to the angle 21. The re-radiated energy will combine with the initial energy to produce a resulting field whose wave front, as represented by a line 25, is at an angle 26 with the surface 20. It will be noticed that the resulting field appears to originate from a direction, as indicated by an arrow 27, different than the initial field. It can be proven mathematically and experimentally that the error between the indicated direction and the true direction increases from zero to a maximum and returns to zero as the angle 21 is varied between zero and 90°. The maximum error will occur slightly before the angle 21 is equal to 45° and will depend on the percentage of the energy that is re-radiated.

Figure 6:
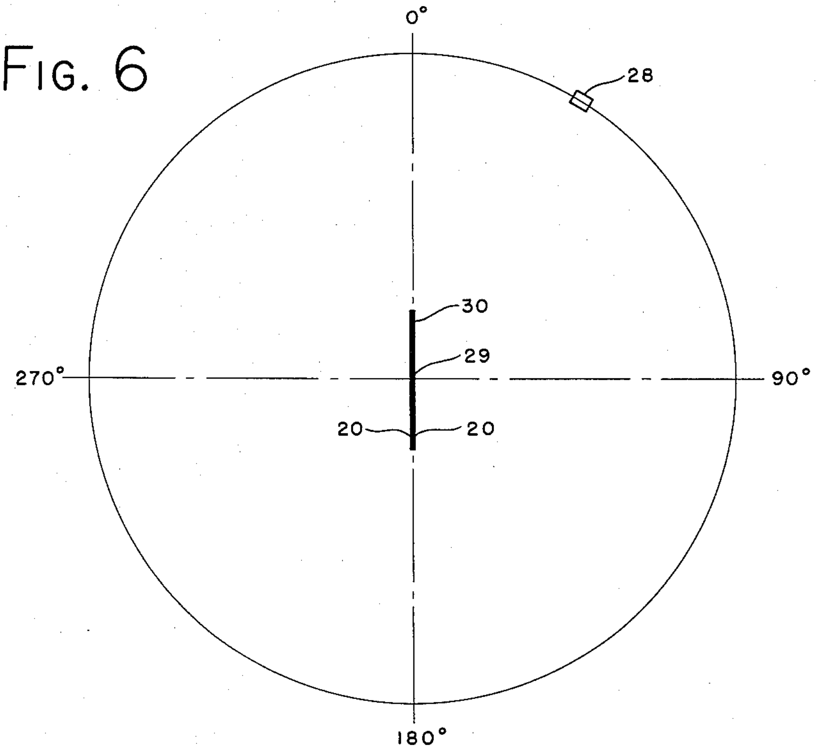
Fig. 6 shows an object about which is revolving a transmitting station.
Figure 7:
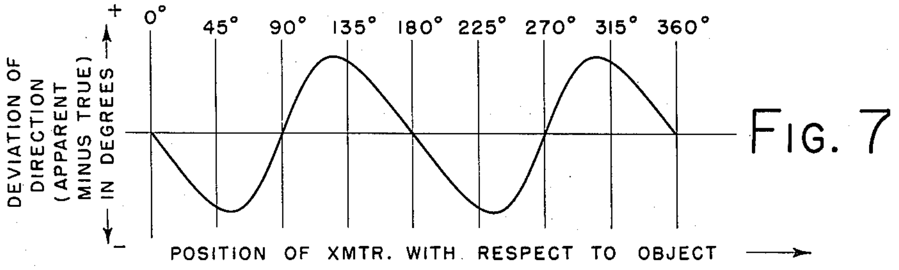
Fig. 7 is a plot of the variation of the error, as viewed from the object, existing between the apparent direction and the actual direction of the transmitting station in Fig. 6.

Referring to Fig. 6, a top view of an object 30 is shown, whose thickness is relatively small and whose flat sides are relatively large and are conducting surfaces 20. A transmitting station 28 revolves about the object 30. If the error in the electromagnetic field about a point 29 is computed for various positions of the transmitting station 21 as it revolves about the point 29, the deviation plot in Fig. 7 is obtained. This plot approaches a sine wave and reverses polarity for each 90° through which the transmitting station 28 passes.

Although an airplane does not present a flat exterior surface as discussed in the explanation of Figs. 5 through 7, a similar phenomenon occurs and is commonly referred to as quadrantal error. Obviously, quadrantal error will produce incorrect directional indications in the airplane.

The present invention provides means for producing deviations in the opposite sense such as to reduce the effect of the quadrantal error in the signal arriving at the indicating means within the airplane.

In the preceding discussion with respect to the antennae depicted in Figs. 1 and 3, the bars 1 were all assumed to be dimensionally and compositionally identical. Typical directivity patterns obtained under these assumptions are illustrated in Figs. 2*d* and 4*d*. It will be noted that the directivity pattern rotated in synchronism with the pick-up 2. If the sensitivity of one of the pairs of bars 1 is changed, the directivity pattern of the antenna will not rotate in synchronism with the pick-up 2.

Figure 8A:
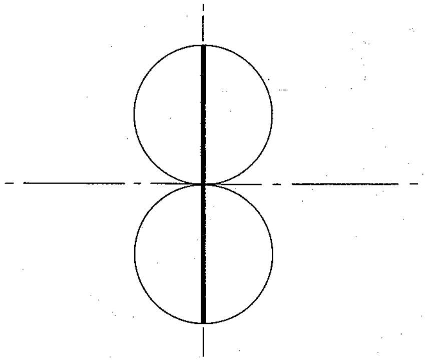
Figure 8B:
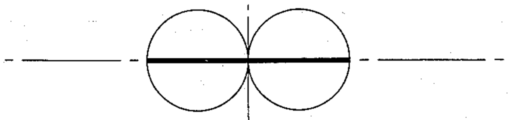
Figure 8C:
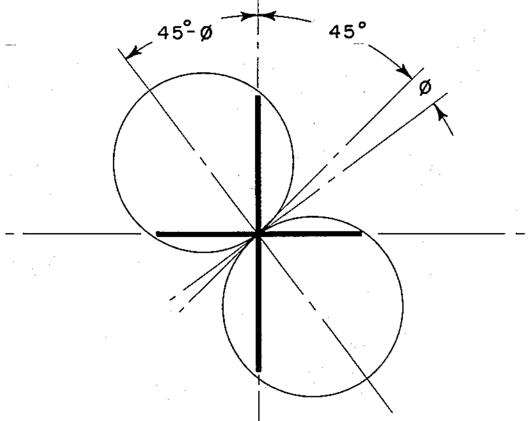
Figure 8D:
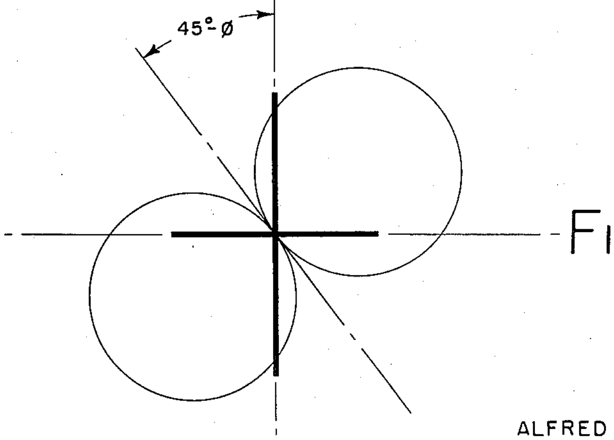

This may be illustrated by increasing the sensitivity of the vertical pair of bars 1. Referring to Figs. 2*a* through 2*d*, it will be readily seen that if the sensitivity of the vertical bars 1 is increased, the antenna will be more sensitive but the directivity pattern will remain in the same position. Referring to Figs. 3 and 4*a* through 4*d*, an increase in the sensitivity of the vertical bars 1 will cause the pattern not to rotate in synchronism with the pick-up 2 as shown in these figures. To illustrate this effect, Figs. 8*a* through 8*d* represent the patterns obtained from an antenna as represented in Fig. 3 where the vertical bars 1 have a greater sensitivity than the horizontal bars 1. It may be proven mathematically and graphically that the directivity pattern, as illustrated in Fig. 8*d*, will rotate $45°-\phi$ when the pick-up 2, as shown in Fig. 3, is rotated 45°. A plot illustrating the deviation in the directivity for all positions of the pick-up 2 is shown in Fig. 9. It will be noted that this plot is in the opposite sense with respect to the plot of Fig. 7. This effect will sufficiently reduce the effect of quadrantal error to within tolerable limits.

Several methods of increasing the sensitivity of one pair of bars are (1) increasing their lengths or cross-sectional areas, (2) providing material having a higher permeability, and (3) saturating a pair of the bars 1 with an auxiliary magnetic field.

Although three means for performing the invention have been discussed, it is to be understood that this is not meant to limit the invention since the invention may be embodied in other forms.

What is claimed is:

1. A magnetic antenna comprising: a rotatably mounted high permeability core with a coil wound therearound; a plurality of high permeability pole pieces; a plurality of high permeability antenna elements equal in number to the said first plurality; and means securing one of each of the said elements to a respective one of the said pole pieces such that the longitudinal axes of the said elements pass through the center of the said core with the said means maintaining a region of low reluctance therebetween; said antenna elements having different sensitivity characteristics.

2. A magnetic antenna comprising: a rotatably mounted high permeability core with a coil wound therearound; a plurality of high permeability pole pieces; a plurality of high permeability antenna elements equal in number to the said first plurality; and means securing one of each of the said elements to a respective one of the said pole pieces such that the longitudinal axes of the said elements pass through the center of the said core with the said means maintaining a region of low reluctance therebetween; said antenna elements differing in length such as to have different sensitivity characteristics.

3. A magnetic antenna comprising: a rotatably mounted high permeability core with a coil wound therearound; a plurality of high permeability pole pieces; a plurality of high permeability antenna elements equal in number to the said first plurality; and means securing one of each of the said elements to a respective one of the said pole pieces such that the longitudinal axes of the said elements pass through the center of the said core with the said means maintaining a region of low reluctance therebetween; said antenna elements differing in cross-sectional area such as to have different sensitivity characteristics.

4. A magnetic antenna comprising: a rotatably mounted high permeability core with a coil wound therearound; a plurality of high permeability pole pieces; a plurality of high permeability antenna elements equal in number to the said first plurality; and means securing one of each of the said elements to a respective one of the said pole pieces such that the longitudinal axes of the said elements pass through the center of the said core with the said means maintaining a region of low reluctance therebetween; said antenna elements differing compositionally such as to have different sensitivity characteristics.

5. A magnetic antenna comprising: a rotatably mounted low reluctance core with a coil wound therearound; a plurality of low reluctance pole pieces; a plurality of low reluctance antenna elements equal in number to the said first plurality; and means securing one of each of said elements to a respective one of said pole pieces such that the longitudinal axes of the said elements pass through the center of the said core with the said means maintaining a region of low reluctance therebetween; said antenna elements having different sensitivity characteristics.

6. A magnetic antenna comprising: a rotatably mounted low reluctance core with a coil wound therearound; a plurality of low reluctance pole pieces; a plurality of low reluctance antenna elements equal in number to the said first plurality; and means securing one of each of said elements to a respective one of said pole pieces such that the longitudinal axes of the said elements pass through the center of the said core with the said means maintaining a region of low reluctance therebetween; said antenna elements differing in length such as to have different sensitivity characteristics.

7. A magnetic antenna comprising: a rotatably mounted low reluctance core with a coil wound therearound; a plurality of low reluctance pole pieces; a plurality of low reluctance antenna elements equal in number to the said first plurality; and means securing one of each of said elements to a respective one of said pole pieces such that the longitudinal axes of the said elements pass through the center of the said core with the said means maintaining a region of low reluctance therebetween; said antenna elements differing in cross-sectional area such as to have different sensitivity characteristics.

8. A magnetic antenna comprising: a rotatably mounted low reluctance core with a coil wound thereabound; a plurality of low reluctance pole pieces; a plurality of low reluctance antenna elements equal in number to the said first plurality; and means securing one of each of said elements to a respective one of said pole pieces such that the longitudinal axes of the said elements pass through the center of the said core with the said means maintaining a region of low reluctance therebetween; said antenna elements differing compositionally such as to have different sensitivity characteristics.

References Cited in the file of this patent

UNITED STATES PATENTS

| | | |
|---|---|---|
| 2,279,422 | Vaudoux | Apr. 14, 1942 |
| 2,454,768 | Burroughs | Nov. 30, 1948 |